United States Patent [19]

Block et al.

[11] Patent Number: 5,743,841
[45] Date of Patent: *Apr. 28, 1998

[54] FOAM COMPOSITION FOR TREATING ASBESTOS-CONTAINING MATERIALS AND METHOD OF USING SAME

[75] Inventors: Jacob Block, Rockville; Natalia Vera Krupkin, Timonium; Daniel Reid Kuespert, Columbia, all of Md.; Gary Masaru Nishioka, Pataskala, Ohio; John Wing-Keung Lau, North Potomac, Md.; Nigel Innes Palmer, Boca Raton, Fla.

[73] Assignee: W. R. Grace & Co.-Conn., New York, N.Y.

[*] Notice: The term of this patent shall not extend beyond the expiration date of Pat. No. 5,741,358.

[21] Appl. No.: 721,857

[22] Filed: Sep. 27, 1996

[51] Int. Cl.$^6$ .............. A62D 3/00; B09B 3/00; C01F 11/12
[52] U.S. Cl. .............. 588/254; 423/167.1; 588/901
[58] Field of Search .............. 423/167.1; 588/901, 588/254; 106/699

[56] References Cited

U.S. PATENT DOCUMENTS

| | | | |
|---|---|---|---|
| 112,650 | 3/1871 | Stevens | 423/167.1 |
| 1,094,505 | 4/1914 | Whitney | 423/167.1 |
| 3,297,516 | 1/1967 | Naumann et al. | 423/167.1 |
| 3,551,228 | 12/1970 | Meth | 156/24 |
| 3,639,283 | 2/1972 | Crotty | 252/98 |
| 3,867,218 | 2/1975 | Henry | 156/8 |
| 3,880,176 | 4/1975 | Horne | 134/167 C |
| 3,914,184 | 10/1975 | Harada et al. | 252/247 |
| 3,957,571 | 5/1976 | Bodycomb, Jr. | 162/3 |
| 3,965,284 | 6/1976 | Xanthos et al. | 162/155 |
| 4,055,458 | 10/1977 | Niederpriim et al. | 156/663 |
| 4,284,601 | 8/1981 | Chay et al. | 422/40 |
| 4,328,197 | 5/1982 | Flowers | 162/3 |
| 4,347,150 | 8/1982 | Arpin | |
| 4,356,057 | 10/1982 | Lalancette et al. | 162/3 |
| 4,371,449 | 2/1983 | Smith, Jr. | 252/142 |
| 4,376,673 | 3/1983 | Cheung | 156/662 |
| 4,395,304 | 7/1983 | Kern et al. | 156/657 |
| 4,401,636 | 8/1983 | Flowers | 423/167.1 |
| 4,474,742 | 10/1984 | Graceffa et al. | 423/331 |
| 4,495,223 | 1/1985 | Lalancette et al. | 427/215 |
| 4,555,304 | 11/1985 | Salzle | 156/663 |
| 4,582,624 | 4/1986 | Enjo et al. | 252/79.4 |
| 4,632,847 | 12/1986 | Lomasney et al. | 427/154 |
| 4,693,755 | 9/1987 | Erzinger | 134/4 |
| 4,795,590 | 1/1989 | Kent et al. | 252/307 |
| 4,810,280 | 3/1989 | LeVan Mao et al. | 71/62 |
| 4,812,204 | 3/1989 | Delvaux et al. | 162/3 |
| 4,818,143 | 4/1989 | Chou | 523/102 |
| 4,866,105 | 9/1989 | Batdorf | 252/143 |
| 4,897,213 | 1/1990 | Brink | 252/143 |
| 4,921,572 | 5/1990 | Roche | 156/653 |
| 4,971,086 | 11/1990 | Haug et al. | 134/4 |
| 4,978,516 | 12/1990 | Yamada et al. | 423/167.1 |
| 5,006,490 | 4/1991 | Logan et al. | 501/135 |
| 5,019,291 | 5/1991 | Faulks | 252/174.22 |
| 5,034,075 | 7/1991 | McMath | 136/71 |
| 5,034,247 | 7/1991 | Batdorf | 134/4 |
| 5,039,365 | 8/1991 | Rutledge, Sr. et al. | 156/71 |
| 5,041,277 | 8/1991 | Mirick | 423/167.1 |
| 5,085,838 | 2/1992 | Mason | 423/167.1 |
| 5,091,053 | 2/1992 | Blonder et al. | 156/663 |
| 5,096,692 | 3/1992 | Ek | 423/657 |
| 5,143,757 | 9/1992 | Skinner | 427/407.1 |
| 5,240,508 | 8/1993 | Gwilliam | 134/34 |
| 5,258,131 | 11/1993 | Mirick et al. | 423/167.1 |
| 5,258,562 | 11/1993 | Mirick et al. | 423/167.1 |
| 5,264,655 | 11/1993 | Mirick et al. | 423/167.1 |
| 5,317,056 | 5/1994 | Batdorf et al. | 524/556 |
| 5,330,795 | 7/1994 | Batdorf et al. | 427/393.6 |
| 5,439,322 | 8/1995 | Barnett | 588/254 |
| 5,466,489 | 11/1995 | Stahl | 427/421 |
| 5,514,222 | 5/1996 | Williams | 134/42 |
| 5,516,973 | 5/1996 | Mirick et al. | 423/167.1 |
| 5,543,120 | 8/1996 | Selby | 423/167.1 |

*Primary Examiner*—Gary P. Straub
*Attorney, Agent, or Firm*—Howard J. Troffkin

[57] ABSTRACT

A composition for transforming a chrysotile asbestos-containing material into a non-asbestos material is disclosed, wherein the composition comprises water, at least about 30% by weight of an acid component, at least about 0.1% by weight of a source of fluoride ions, and a stable foam forming amount of a foaming agent system having both cationic and non-ionic functionality. A method of transforming the asbestos-containing material into a non-asbestos material using the present composition in the form of a foam also disclosed.

10 Claims, No Drawings

5,743,841

FOAM COMPOSITION FOR TREATING ASBESTOS-CONTAINING MATERIALS AND METHOD OF USING SAME

This invention was made with Government support under contract DE-AC02-76CH00016 awarded by the Department of Energy. The Government has certain rights to this invention.

RELATED APPLICATIONS

This application is related to the following commonly assigned applications, which have been filed simultaneously herewith and the disclosures of which have been incorporated herein by reference in their entirety:

(1) Ser. No. 08/721,854 (Docket No. 8903), entitled COMPOSITION AND METHOD TO REMOVE ASBESTOS;

(2) Ser. No. 08/721,859 (Docket No. 9032), entitled COMPOSITION AND METHOD TO REMOVE ASBESTOS;

(3) Ser. No. 08/721,858 (Docket No. 9161), entitled COMPOSITION AND METHOD TO REMOVE ASBESTOS;

(4) Ser. No. 08/721,863 (Docket No. 9225), entitled COMPOSITION AND METHOD TO REMOVE ASBESTOS;

(5) Ser. No. 08/721,856 (Docket No. 9116), entitled FOAM COMPOSITION FOR TREATING ASBESTOS-CONTAINING MATERIALS AND METHOD OF USING SAME; and (6) Ser. No. 08/721,853 (Docket No. 9130), entitled CORROSION INHIBITING COMPOSITION FOR TREATING ASBESTOS-CONTAINING MATERIALS.

BACKGROUND OF THE INVENTION

This invention relates to methods and compositions for digesting the chrysotile form of asbestos ("chrysotile asbestos") into a non-asbestos material while the chrysotile asbestos is a component of a gypsum-containing cementitious composite, and especially to methods and compositions for the in-place digestion of chrysotile asbestos present in composite material that is bonded to a support structure.

Chrysotile asbestos is a serpentine asbestos fibrous-like material consisting of alternating layers of silica and magnesium oxide/hydroxide bound to each other through covalently shared oxygen.

At least in part because of its availability and unique fire resistance and thermal properties, chrysotile asbestos has been used commercially in a variety of building products, including, for example, fire resistant roofing shingles, acoustical plasters, fire resistant and thermally insulating coating compositions and the like. In the formation of fire resistant coating compositions, found to be appropriate for treatment by the present invention, small amounts of chrysotile asbestos were mixed with a settable bonding material comprising gypsum (e.g. calcium sulfate hemihydrate) and, optionally, other materials such as vermiculite and the like. The composition was then applied to a structure where it forms a hardened coating. For example, such compositions found considerable use in multi-story buildings wherein the gypsum-containing composition was applied as an adherent coating to steel girders, floor support plates, concrete decking and the like to provide fire resistance and high-temperature thermal insulation properties which aid in preventing damage and even possible collapse of such buildings in the event of fire.

In recent years asbestos has been classified as a regulated material in the United States. Federal, state and local government agencies have promulgated regulations dealing with the use and disposal of asbestos-containing building materials. The U.S. Environmental Protection Agency ("EPA") has defined asbestos-containing material ("ACM") as a material which contains greater than one percent (1%) asbestos and requires special handling of such material. In accordance with various regulatory procedures, various safeguards are employed to protect workers from inhaling asbestos fibers during removal or demolition activities. Such safeguards include, among others, requiring workers to wear approved respirator or breathing apparatus, as well as protective clothing, requiring any area in a building in which asbestos-containing material is being removed to be isolated or enclosed from the remainder of the building, and requiring the enclosed work area to be kept at a negative pressure by the use of special apparatus equipped with HEPA filters to prevent airborne asbestos fibers from leaving the work area. Such isolation of the work area is an expensive and time-consuming part of the process.

Generally, prior art methods for handling asbestos-containing building materials have taken several approaches. One approach has been to chemically alter asbestos fibers before using them in building products. This approach is discussed, for example, in U.S. Pat. Nos. 4,328,197 and 4,401,636, both to Flowers, and in U.S. Pat. No. 4,474,742 to Graceffa et al.

Greceffa et al (U.S. Pat. No. 4,474,742) teach treatment of asbestos with hydroxamic acid and iron chelating agents to remove the iron present in the asbestos based on the presumption that the iron is the harmful component. In the Flowers patents (U.S. Pat. No. 4,328,197 and U.S. Pat. No. 4,401,636), one is taught to contact asbestos fibers with an aqueous solution of a weak base/strong acid or a strong base/weak acid salt of manganese, chromium, cobalt, iron, copper or aluminum or mixtures thereof, to convert the asbestos fibers into a metal-micelle product. In general, the process contemplated by Flowers is effected by preparing a slurry of asbestos fibers in an aqueous solution of the appropriate salt, effecting the conversion of the asbestos fibers to metal-micelle fibers in the slurry, and recovering the metal-micelle fibers from the slurry for use in the subsequent preparation of the desired fiber-containing end product.

Another approach is to treat previously formed asbestos-containing building materials by encapsulating the materials to thereby prevent the asbestos fibers from becoming airborne. A resinous encapsulating coating material typically would be applied by spraying, brushing or troweling. Care must be taken when using encapsulating methods so as not to physically damage the building material being encapsulated. Encapsulation is a containment method and, thus, the encapsulated asbestos material remains in place during the life of the building.

A number of removal techniques have been proposed, and each has its advantages and disadvantages. For example, it has been proposed to simply scrape or chip away at dry untreated asbestos-containing material and to collect the scrapings for discard. This technique, which is referred to as dry removal, is generally considered unacceptable by regulatory authorities since it provides no safeguard against the release of airborne asbestos particles.

Dry vacuum methods have been attempted to overcome the problems of simple dry removal by incorporating an exhaust filtering system to prevent pollution to the outside environment and by using sealed containers for storing and discarding the collected asbestos-containing material. One of the disadvantages of this dry vacuum method is that the bond between the dry building material and the underlying surfaces on which it is coated may be stronger than the vacuum capabilities of the equipment. In those cases, it is necessary to dislodge at least a portion of the asbestos-containing material by scraping or chipping, which has the same limitations as the dry removal process described above.

Wet removal processes have been developed as a means for reducing the problems associated with the various dry removal techniques. Wet removal generally involves wetting a building material with water or water-surfactant solution to soften it and to thereby facilitate its removal. Wet removal clearly represents an improvement over dry removal. However, the use of water as a softening agent is not entirely satisfactory because water penetrates slowly, does not completely wet most building materials, and tends to run off the surfaces being treated.

Over the past several years, wet removal techniques have been improved by devising more effective wetting and/or softening compositions. Recent U.S. patents which relate to such improved wet removal techniques include, for example, U.S. Pat. No. 4,347,150 to Arpin; U.S. Pat. No. 4,693,755 to Erziner; and U.S. Pat. No. 5,258,562 to Mirick et al.

The Arpin patent discloses a technique for wetting and removing friable insulating materials from an underlying substrate using a two-part wetting system. The first component of the system comprises an aqueous alkali metal silicate dispersion blended with a cationic or nonionic surfactant and the second component comprises a mixture of an acrylic latex and a reagent that is reactive with the alkali metal silicates in the first part. The two parts are stored separately and are mixed shortly before use to form a stripping composition which facilitates the removal of the building material while encapsulating the individual asbestos fibers contained therein. The removed material must be handled as an asbestos-containing material.

The Erzinger patent exemplifies a wet method for removing asbestos-containing materials from a substrate. This patent discloses applying a composition containing a cellulosic polymer to the asbestos-containing material, allowing the cellulosic polymer-containing composition time to penetrate and wet the asbestos-containing material, removing the wet material from the underlying substrate by mechanical forces, and collecting the removed material for discard.

The Mirick et al patent is centered on the concept of removing asbestos fiber containing building material by applying a dilute aqueous solution of an acid, which may include a separate source of fluoride ions such as an alkali metal or ammonium salt of hydrofluoric acid to the building material for the purpose of conditioning the material to aid in its removal while partially converting the asbestos fibers. The building material, after having been treated with the dilute acid solution, is preferably removed for further treatment and/or discard. Mirick et al further contemplate that the wet building material, once removed, can then be digested by immersing the material into a bath of an acid solution, preferably with heating and agitation, until all of the asbestos material has been destroyed.

Several problems are associated with wet removal techniques. The treatment solutions are conventionally applied to the building material by spray or brush application. These application techniques have an abrasive quality which may dislodge at least a portion of the surface of the building material causing some asbestos fibers to become airborne. Further, such application can provide delivery of only small amounts of the active materials on a per pass basis. Attempts to apply greater amounts on a per pass application merely causes run-off of the excess over that which the building material is capable of absorbing within the application time. Thus, even attempts to totally wet a material is difficult to achieve and requires, at least, multiple applications of limited amounts. Finally, the conventional means of applying liquid to asbestos-containing materials do not provide a way to control dosage.

It is desired to have a means of applying a composition capable of transforming chrysotile asbestos containing material to a non-regulated material in an effective and efficient manner.

SUMMARY OF THE INVENTION

It is an object of the present invention to provide an improved composition and method for treating porous inorganic building materials which contain chrysotile asbestos to transform the building materials to non-asbestos materials (i.e., materials which contain less than 1% by weight chrysotile asbestos), while the building materials are part of the building environment and supported on an underlying substrate.

Another object is to treat a building material which contains gypsum, chrysotile asbestos and, optionally, other components, such as porous aggregate particulate as, for example, vermiculite, while part of a building structure, to transform the building material into a non-regulated material, with an acid treating composition that contains an acid-stable foaming agent system in an amount sufficient to provide a stable foamed treating composition that is capable of adhering to and soaking into the building material being treated. The system thereby provides a mode of applying the acid treating composition in an effective manner.

In accordance with the invention, these and other objects and advantages are achieved by the present compositions and method for transforming chrysotile asbestos material to non-asbestos material. The compositions comprises a unique combination of (i) water, a high concentration of an acid component comprising an inorganic acid, an inorganic acid salt or mixtures thereof, with a fluoride ion source, or, alternatively, (ii) an aqueous solution having at least one tetrafluoroborate or hexafluorosilicate salt or mixtures thereof in high concentrations. The compositions further contain an acid stable foaming agent system comprising both cationic and non-ionic functionality. The present composition is applied to the chrysotile asbestos-containing materials, particularly chrysotile asbestos-containing building materials, in the form of a stable foam which permits absorption of from about 8 to 20 parts by weight of treating composition per part by weight of chrysotile asbestos in the material being treated.

DETAILED DESCRIPTION OF PREFERRED EMBODIMENTS

The present invention is intended for the treatment of porous inorganic cementitious materials which contain chrysotile asbestos fibers to transform the building materials to non-asbestos materials. The present invention is especially useful for digesting chrysotile asbestos fibers contained in gypsum-based building materials that have been previously applied to the structural components, such as steel beams, decking and the like of buildings as coatings thereon to provide fire and heat resistance thereto.

The present invention provides a treating composition which is an aqueous solution or dispersion in the form of a stable foam. The foaming agent system described herein has been unexpected found to be capable of carrying a high quantity of an aqueous system having agents capable of digesting chrysotile asbestos while in place as part of a cementitious building material, of adhering to said building material as applied, delivering and transferring the aqueous system to the cementitious building material without loss of foam integrity and without substantial loss of the aqueous system to the building environment.

The aqueous system may comprise (i) a high concentration of an acid component (i.e., an inorganic acid, an inorganic acid salt or mixtures thereof), and a relatively low concentration of a fluoride ion source or, alternatively, (ii) a high concentration of a tetrafluoroborate or hexafluorosilicate salt or mixtures thereof, as described herein below and in the above referenced applications.

The subject compositions contain a unique foaming agent system comprising both cationic and non-ionic functionality in an amount capable of maintaining the treating composition in the form of an acid stable foam, as fully described herein below.

The present foam may deliver an aqueous system having a high inorganic acid content. In such system the acid component can be selected from any strong inorganic acid, or an inorganic acid salt, or mixtures thereof. The acid component should have a pKa of up to about 2.5 and preferably up to about 2.2. Further, the acid component must be highly soluble in water to form the present composition. Preferred inorganic acids include, for example, sulfuric acid, nitric acid, hydrochloric acid, phosphoric acid and mixtures of such acids. The most preferred acid is phosphoric acid. When phosphoric acid is employed as the acid component, it can be used in combination with small amounts of up to about 20% by weight of the total acid content, of other inorganic acids. In addition, small amounts (up to about 5%, preferably up to about 2%, by weight of the acid content) can be in the form of an organic acid. The preferred inorganic acid salts are half acid salts as, for example, ammonium and alkali metal bisulfates and the like. The preferred salts are the ammonium salts of the half acids.

The acid component is employed in the present composition in high concentrations of at least about 30% by weight, based on the weight of the treating compositions, up to the saturation point of the acid in the aqueous system. It is preferred that the acid component be present in from about 30% to about 45% by weight, based on the total weight of the treating composition.

The high acid aqueous treating composition may further contain at least one source of fluoride ions, typically a fluorine-containing salt which is soluble in the aqueous treating compositions in the amounts described hereinbelow. Fluorine-containing salts which may be used in the present treating compositions include, for example, fluorides, bifluorides, fluoroborates, and fluorosilicates of ammonia, alkali metals and alkaline earth metals. Mixtures of such salts also may be used. The preferred fluorine-containing salts are ammonium, alkali metal, or alkaline earth metal fluoroborates or fluorosilicates, such as ammonium tetrafluorosilicate, ammonium hexafluorosilicate, sodium tetrafluoroborate, sodium hexafluorosilicate, potassium tetrafluoroborate or potassium hexafluorosilicate. It has unexpectedly been found that by employing the preferred fluoroborate and fluorosilicate salts, the treating compositions of the present invention can be stored and used to transform chrysotile asbestos-containing building materials to non-asbestos materials while in place in a building environment without generating noxious hydrogen fluoride gas in amounts which are unacceptable for commercial applications, as exemplified by OSHA standards. This represents an improvement over asbestos treating compositions which contain simple fluoride salts, such as sodium fluoride, ammonium fluoride or ammonium bifluoride, which contain hydrogen fluoride in their acidic aqueous systems, and which tend to rapidly generate and expel large quantities of hydrogen fluoride gas when used, thus creating a dangerous work area.

When a fluoride ion source is optionally used in the treatment compositions of this invention, the amount is very small relative to the concentration of the acid component. Thus, concentrations of the fluoride ion source should be up to about 4%, preferably up to about 2% by weight, based on the total weight of the treating compositions, with concentrations of from about 0.1% to about 4% by weight, e.g., from about 0.5% to about 2% by weight, being most preferred.

Alternately, the present invention can be used to deliver an aqueous digestion composition formed from water and a tetrafluoroborate or hexafluorosilicate salt. The salt is preferably formed as the alkali metal, alkaline earth metal or ammonium salt. The salt is normally present in at least about 10 weight percent of the aqueous solution. The salt solution may, optionally, further have small amounts of an inorganic acid such as in amounts of up to about 7 wt. percent, preferably up to about 5 wt. percent and most preferably up to about 2 wt. percent based on the total weight of the aqueous system. The aqueous digestion compositions composed of the subject salt are fully disclosed in copending U.S. applications Ser. Nos. 08/721,863 and 08/721,858 (Docket No. 01-9225 and Docket No. 01-9161) the disclosure of which is incorporated herein by reference.

In addition to the digestion components, as described above, the present treating compositions must contain an acid stable foaming system comprising both cationic and non-ionic functionality in order to enable the highly acid treating compositions of this invention to be used effectively in the form of a stable foam capable of delivering the digestion agents in the water into a cementitious material.

The foaming agent system selected for use in the present treating compositions must be capable of imparting several critical properties to the treating compositions. For example, the selected foaming agent system must enable the treating composition to form a stable foam using equipment which is convenient for field operations. As used in this specification and claims, the term "stable foam" is meant to define a relatively dense foam (density of at least about 0.05 to 0.4 g/cc and preferably from about 0.05 to 0.15 g/cc) that is capable of existing in a highly acid environment. Further, the foaming agent system must be capable of forming a foam which is capable of adhering to cementitious building material and the like no matter what the orientation of the building material (e.g., horizontal, vertical floor, ceiling). Still further, the foaming agent system must be capable of maintaining its integrity while it releases and provides its aqueous system to enter into the pores of the cementitious building material (e.g., the foam must be capable of existing for a sufficient time to permit penetration without drainage, as for example, at least 1 minute, preferably at least about 2 minutes and most preferably at least about 10 minutes after application to provide the aqueous treating composition sufficient time to enter into the building material without causing any significant drainage to the environment.

It is readily seen that the above needs have counter balancing forces and, therefore, it is unexpected that a foam composition presently described can be achieved.

The foaming agent system also should provide the foamed treating composition with high cohesive and adhesive properties. In other words, the foamed treating composition should have enough cohesive strength to hold itself together as a mass with semi-solid (pseudoplastic) rheological properties, and enough adhesive strength to adhere to the asbestos-containing material being treated in the form of a relatively thick foam layer. Thus, a foam treating composition in accordance with this invention should have sufficient adhesive strength to adhere as a layer of foam of from about 0.5 to about 2 inches in thickness to a building material disposed on a vertical or inverted building structure, e.g., an I-beam, with little if any run-off.

The high cohesive and adhesive properties of the present foamed treating composition enable the application of a relatively large quantity of treating composition in a single application. In other words, when the present foamed treating compositions are employed to treat an asbestos-containing building material, such as a thick fireproof coating material disposed on a structural beam in a building, the compositions may be applied in a single application as a relatively thick layer of foam, e.g., 1 to 2 inches thick, which can remain in contact with the building material for an extended period of time. This represents a significant improvement over the use of treating compositions in the form of an aqueous solution or dispersion, which typically must be sprayed or otherwise applied onto a building material in multiple, small dosage applications in order to permit the requisite amount of treating composition to soak into the material being treated while avoiding run-off.

In addition to the high cohesive strength and high adhesive strength achieved by the present foam treating compositions, the present foaming agent system provides resultant foam compositions which are capable of being readily absorbed into the building materials being treated. Thus, the present foaming agent system is capable of lowering the contact angle of the treating composition with respect to the building material being treated while maintaining its surface tension to at least about 30 dynes/cm and preferably at least about 40 dynes/cm. Thus, the present foamed treating composition is capable of wetting and soaking into a building material faster than liquid drains from the foam under the influence of gravity. This is important inasmuch as it is necessary for the treating composition to soak into the building material, without any significant run-off, so that the chrysotile asbestos located in the interior and otherwise unexposed portions of the building material, as well as the chrysotile asbestos located adjacent to or at the exposed surfaces, will be contacted with the acid treating composition and thereby transform the asbestos containing material into a non-regulated material.

It will be appreciated that the time that it takes for a given foam treating composition to soak into a given building material sets a lower limit for the acceptable stability of the foam. In order words, a faster-wetting foam need not be as stable as a slower-wetting foam. It will be further appreciated that the required stability of a particular foam treating composition will vary depending upon its exact formulation, as well as on the particular building material to be treated. In practice, however, it has been found that foam treating compositions in accordance with the present invention are stable enough to exist for at least about 1 minute, and preferably for at least about 2 minutes which is sufficient time duration for the treating composition to be absorbed into at least the portion of the treated material's thickness adjacent to the exposed surface upon which the composition is applied. The composition will then travel through the remainder of the thickness over time.

Because the treating compositions of the invention have a pH of 2 or less, the foaming agent systems that are suitable for use in the present treating compositions should be stable at very low pH conditions. Accordingly, many agents that would be useful for generating a foam composition at a neutral or slightly acidic pH conditions, lose their functionality or decompose in some way under such low pH conditions and, therefore, may not be suitable for use in the present invention. It will be appreciated, of course, that a foaming agent system that is unstable at low pH conditions, or which otherwise undergoes some decomposition, still might be acceptable for use, provided that the time required for such foaming agent system to decompose is longer than the time required for a foamed treating composition to be formed, applied, and soaked into a building material being treated. Thus, many decomposable foaming systems can be used if they are added to the treating composition immediately prior to foam formation and application to a building material.

It has been unexpectedly found that particularly suitable foaming agent systems for use in the present invention provide a combination of foaming and wetting properties. Thus, preferred foaming agent systems comprise a mixture of at least one agent having cationic functionality and at least one agent having non-ionic functionality. The relative amounts of the agent have non-ionic functionality and the agent having cationic groups should be added to the treating composition to provide a functional molar ratio of from about 100:1 to 1:100 preferably from about 100:1 to 1:1, and most preferably from about 70:1 to 5:1. The exact ratio to be used with a particular treating composition will depend on the components of the treating composition as well as the equipment being used to produce the foam and can be determined by small trial run. The term functional group, as used herein and in the appended claims, refers to the chemical function group(s) contained within a molecule. The molecule may be of a small, relatively simple structure or may be polymeric and each molecule may have one or more than one functional group within its molecular structure. The mixture of non-ionic and cationic foaming agent system may be added to the treating composition in amounts up to about 10% by weight based on the weight of the total composition. However, for a typical treating composition in accordance with the present invention, the foaming agent system usually comprises no more than about 5% by weight of the total composition.

The cationic agents which can be used to provide foaming properties to the present treating compositions include purely cationic materials, such as trialkylammonium halides preferably having at least one $C_{10}$–$C_{20}$ alkyl group and the remaining groups selected from $C_1$–$C_3$ alkyl as, for example cetyltrimethylammonium bromide; as well as materials which exhibit only cationic functionality under acidic conditions, such as betaines as for example $C_8$–$C_{20}$ alkylamido ($C_1$–$C_5$ alkyl) betaine, such as laurylamidopropyl betaine. Examples of materials which can be used to provide the foaming properties of the present foaming agent system include mono-, di-, or trialkylamines (e.g., cocamidopropyldimethylamine, available under the name Mackeen 101 from McIntyre), mono-, di-, or tetraalkyl ammonium halides or hydroxides (e.g., cetyltrimethyl ammonium bromide), betaines (e.g., dodecylamidopropyl betaine, available under the name Mirataine BB from Rhone-Poulenc), trialkylamine oxides (e.g., lauryl dimethylamine oxide, available under the name Varox 365 from Witco or AO-728 Special, available from Tomah Products) and the like.

The present foaming system must further include at least one non-ionic surfactant.

These agents are believed, though not meant to be limiting, to provide the driving force which enables the treating composition to be released into the pores against the force of gravity during its application to a porous building material. Not all agents provide the necessary low contact angle/high surface tension properties required of the present foaming agent systems. However, it has been unexpectedly found that non-ionic polyalkoxy compounds provide these properties when used as the non-ionic agent portion of the present foaming agent system in appropriate quantities.

Suitable non-ionic agents include compounds having at least about ten functional units (AO, wherein A is a $C_2$–$C_4$ hydrocarbon) per molecule of non-ionic agent, as for example, ethylene oxide-propylene oxide copolymers (e.g., those sold by BASF under the names Pluronic or Tetronic), polyalkylene oxide homopolymers such as polyethylene glycol and the like, alcohol ethoxylates (e.g., those sold by Union Carbide under the name Tergitol), or alkyl benzene ethoxylates (e.g., those sold under the name Triton by Union Carbide). Additionally, ethoxylated silicones (e.g., those sold under the name Silwet by Witco) have been found to provide good performance when used in the present foaming agent systems.

In lieu of using a foaming agent system which is comprised of at least one cationic agent and at least one non-ionic agent, it is possible to use a foaming agent system that contains one or more agents which contain both cationic and non-ionic groups in their structure. Materials of this type include, for example, tallow amine ethoxylates which contain both a cationic amine group and a polyoxyalkylene chain (e.g., Rhodameen IT-50 of Rhone-Poulenc which contains both a cationic amine group and a non-ionic poly(ethylene oxide) chain in which there are approximately 50 moles of ethylene oxide for each mole of amine). While it is within the scope of the invention to use a single combined cationic/non-ionic material as the foaming agent system, it is preferable to use these agents in combination with small amounts of a material, such as dodecylamidopropyl betaine, capable of providing additional cationic functionality.

The present treatment composition may be readily applied to chrysotile asbestos containing cementitious coatings in any manner so that from about 8 to 20 parts by weight, preferably 9 to 15 parts by weight, of the aqueous treating composition is applied per part by weight of the chrysotile asbestos in the material being treated. The amount to be applied will depend on the amount of chrysotile asbestos initially present in the material, the concentration of the acid in the treating composition and the thickness and absorptive capacity of the material being treated. The exact amount can be readily determined by small scale application and testing.

When further occupancy of the building or treated area is planned, the treating composition, preferably, should contain agents which will inhibit the corrosion of metallic substrate materials (e.g., steel beams, galvanized corrugated decking, steel pipes and the like) to which the material being treated is attached and/or in vicinity thereof. It has been found that certain specific materials are useful as corrosion inhibiting agents for a broad spectrum of metals when part of the present acidic treating composition. These agents, and their incorporation in acidic treating compositions such as that described herein, which digest chrysotile asbestos to form a non-asbestos material and the utilization to transform the asbestos-containing cementitious material to a non-regulated material is fully described in a concurrently filed, copending application, U.S. Ser. No. 08/721,853(Docket No. 9130), entitled COMPOSITION AND METHOD TO REMOVE ASBESTOS, the teachings of which are incorporated herein in its entirety by reference.

The method of the present invention transforms chrysotile asbestos-containing material into a material which contains very little, if any, chrysotile asbestos when measured, for example, by polarized light microscopy, X-ray diffraction, or other conventional methods. The resultant treated material contains less than one percent (1%), and normally less than one-half of one percent (0.5%) chrysotile asbestos in the overall structure of the resultant material. Thus, the material treated by the present composition results in a product which meets the U.S. governmental standards of a non-regulated asbestos-free material which may be safely handled by ordinary means. Further it has been unexpectedly found that the present composition and method provides this transformation without causing a degradation of the cementitious material and, thereby, permits the material to remain in place and to continue to provide the functions of fire resistance, etc. for which it was initially installed.

The chrysotile asbestos contained in the cementious material is substantially completely digested to provide a non-regulated product while in place and part of the cementitious material. Typically, at least about eighty five percent, and preferably at least about ninety percent, of the chrysotile fibers are digested by the present composition and method to provide a non-regulated, safe product without degradation of the cementitious material and, thereby, not require removal of the material nor detract from the properties of the cementitious coating material.

All that is necessary to achieve the digestion of the chrysotile asbestos fibers in accordance with the present invention is to wet the material containing the chrysotile fibers with the foamed treating composition of the present invention. In the case of asbestos-containing building materials, such as fireproofing materials coated on girders, beams and floor support plates, this can be done by spraying the foamed treating composition directly onto the asbestos-containing material, preferably while it is in place in the building environment using conventional foam application equipment. It is unnecessary to disturb the asbestos-containing materials in order to expose the asbestos fibers, since the foamed treating compositions typically will penetrate into the building materials and contact the asbestos fibers contained therein. Further, the foam composition provides a non-abrasive, pseudo-encapsulating means of treating the building material.

The present foamed treating composition should be applied to the gypsum-containing cementitious building material in manners which permit a total application of from about 100 to 200% by weight, preferably from about 125 to about 175% by weight, of the subject composition based on the weight of the cementitious building material. The exact amount will depend on the concentration of chrysotile asbestos in the building material treated.

Because of the high concentration of acid in the treating compositions of the invention, along with the catalytic presence of the fluoride ion source and the foaming agent system, the desired asbestos transformation may be achieved by a single application of the foamed treating composition on the building material while it is in place in the building environment. However, in some cases it may be necessary or desirable to make successive applications, preferably without any intermediate drying step, until the desired degree of digestion of the chrysotile asbestos is achieved.

The preferred manner of applying the foamed treating composition to the material is by applying the composition directly onto the major free surface(s) of the building material. As the material to be treated is in the form of a coating on a building component, usually one major surface is exposed and free for application of the subject composition. Application of a foamed aqueous treating composition provides an extended contact time and a pseudo-encapsulation of the material being treated while the transformation is occurring.

It has been found that when a chrysotile asbestos-containing material is transformed in place in accordance with the present invention, the physical integrity and adherence of the resulting non-asbestos material to the underlying substrate are such that it may be left in place to perform the fireproofing or other function for which the asbestos-containing material was originally installed. The resultant material subsequently may be treated by spraying or the like with a mild alkaline solution, such as sodium bicarbonate, calcium carbonate, sodium carbonate, magnesium hydroxide or the like in order to neutralize any remaining acid in the material.

Even though it has been found that building materials which have been treated in place with the present treating compositions to transform any asbestos contained therein to non-asbestos material essentially maintain their physical integrity and adherence to the underlying substrate, there are cases when it is necessary or desirable to strengthen the material or its adherence to the substrate. This can be accomplished by applying a polymeric binding agent to the material, either before the building material has been initially wet with the foamed treating composition or after the building material has been treated and/or neutralized as described above. The method of the invention, as applied to the treatment of asbestos in buildings, may typically include the step of removing any obstructions, such as interior partitions, ceilings and column covers, to expose the asbestos-containing material to be treated. This will enable the sampling and testing of the material to determine its composition and other relevant characteristics, thereby facilitating the selection of an optimum asbestos treatment composition and treatment procedure in accordance with the invention. The foamed treatment composition is then applied directly to the asbestos-containing material while in place in amounts described above to provide a non-regulated material. The resultant material may be further treated with a neutralizing agent.

The following examples are intended to illustrate the invention without imposing limits of the invention, as defined by the claims appended hereto. All parts and percentages by weight unless otherwise indicated.

EXAMPLE 1

To a treating composition containing 38.3% phosphoric acid, 1.6% ammonium hexafluorosilicate and 0.05% diethylthiourea (corrosion inhibitor), there was added 2% tallow amine ethoxylate (Rhodameen IT-50/46, 46% active) which has both cationic and non-ionic groups. The resulting composition was foamed using an Oakes rotor-stator powered mixer to produce a foam having a density of 0.0896 g/ml with a drainage time (i.e., the time required for one-half of the liquid contained in the foam to drain by means of gravity) was between 4 and 7 minutes. Multiple applications of the foamed composition were applied to a 2-inch thick sample of porous gypsum-based fireproofing material containing 12.7% chrysotile asbestos. Each application of the foamed composition soaked into the fireproofing material, with a total contact time of 1 hour and 47 minutes to produce a loading of 1.39 times the fireproofing material weight. After being fully loaded with the treating composition, the fireproofing material was allowed to stand undisturbed for 96 hours. The resulting treated fireproofing material was washed, dried and analyzed for chrysotile by X-ray diffraction. No chrysotile was detected, indicating that over 99% of the original chrysotile had been transformed to non-asbestos material.

EXAMPLE 2

The procedure of Example 1 was repeated, except that only 1% of the tallow amine ethoxylate was added to the treating composition. The resulting mixture produced a stronger, more cohesive foam than was produced in Example 1. Only one-half of the number of applications of the foamed composition of this example were needed compared to the applications of foamed composition of Example 1 to achieve the same loading. However, a contact time of 4 hours and 9 minutes was required (compared to the contact time of 1 hour and 47 minutes for Example 1).

EXAMPLE 3

An aqueous treating composition (30.4% phosphoric acid, 1.5% ammonium hexafluorosilicate and 0.051% diethylthiourea) was mixed with 7.4% of the tallow amine ethoxylate agent used in Example 1(Rhodameen IT-50/46) and 0.5% lauramidopropyl betaine (Mirataine BB) to provide greater cationic functionality. The resulting composition was foamed using an air-impregnating foam mixer to produce a stable foam which was applied to a two-inch thick gypsum-based fireproofing material containing 12.7% chrysotile asbestos. About 15 passes of application of the foamed composition produced a loading of 1.5 times the fireproofing material weight. After being fully loaded with the treating composition, the fireproofing material was allowed to stand undisturbed for 16 days. The resulting treated fireproofing material was analyzed for chrysotile asbestos by X-ray diffraction. No chrysotile was detected, indicating that less than 0.2 wt. percent asbestos remained in the treated material to provide a non-regulated material.

EXAMPLE 4

A treating composition containing 38.3% phosphoric acid, 1.5% ammonium hexafluorosilicate, 0.05% diethylthiourea, 0.75% lauryldimethylamine oxide cationic surfactant (AO-728 of Tomah Products), 0.75% dodecylamidopropyl betaine (Mirataine BB, Rhone-Poulenc), and 0.75% ethoxylated silicone non-ionic surfactant (Silwet L-7600 , Witco) was prepared. The composition was foamed using an Oakes mixer. Several applications of approximately 0.25 in thick foam were applied to a gypsum-based porous fireproofing material. Each layer of the foam adhered well to the fireproofing material and each readily soaked into the material being treated.

EXAMPLE 5

(Comparative)

For comparative purposes, the procedure of Example 4 was repeated, except that the ethoxylated silicone non-ionic surfactant was not included as part of the treating composition, thereby leaving the treating composition with only cationic surfactant functionality. Although a foam was produced, it failed to soak into the fireproofing material.

EXAMPLE 6

A treating composition containing 38.3% phosphoric acid, 1.5% ammonium hexafluorosilicate, 0.05% diethylthiourea, 0.1% cocamidopropyl dimethylamine cationic surfactant (Makeen 101, McIntyre), and 2% ethoxylate tallow amine cationic/non-ionic surfactant (Rhodameen T-50, 50 moles ethylene oxide: 1 mole amine, 1 100% active, Rhone-Poulenc) was prepared. The composition was foamed using an Oakes mixer. The resulting foam was applied to a porous fireproofing material and was stable, adhered well to the porous fireproofing material, and soaked into the fireproofing material at an acceptable rate ((i.e., 150% loading in approximately 4 hours) without run-off.

EXAMPLE 7

(Comparative)

For comparative purposes, the procedure of Example 6 was repeated, except that the ethoxylate tallow amine cationic/non-ionic surfactant was deleted from the treating composition, thereby leaving the treating composition with only cationic surfactant functionality. Although a foam was produced, it failed to be absorbed by the fireproofing material.

EXAMPLE 8

(Comparative)

A treating composition containing 50% phosphoric acid and 1% ethylene oxide/propylene oxide copolymer nonionic surfactant (Pluronic 187 of BASF), was prepared. The composition was foamed using an Oakes mixer. The resulting foam was unstable and collapsed immediately upon application.

EXAMPLE 9

(Comparative)

A treating composition containing 85% phosphoric acid and 0. 1% FC-98 anionic surfactant (proprietary anionic fluorosurfactant, 3M Company) was prepared. The composition was foamed using an Oakes mixer. The resulting foam was unstable and collapsed immediately upon application.

What is claimed is:

1. A method of treating a chrysotile-asbestos containing porous building material (ACM) installed on a substrate in a building, comprising:

(a) providing an admixture composition derived from admixing (i) water, (ii) at least about 30% by weight of an acid component comprising an inorganic acid, an inorganic acidic salt or mixtures thereof, (iii) from about 0.1 to about 4% by weight of a source of fluoride ions;

and (iv) a stable foam generating amount of a foaming agent system comprising at least one agent providing cationic and non-ionic functionality in a molar ratio of cationic to non-ionic functional group of from about 100:1 to 1:100;

(b) foaming the composition from step (a);

(c) applying the resulting foamed composition to the ACM chrysotile asbestos-containing building material;

(d) permitting the foamed composition to remain on and penetrate the building material and contact the chrysotile asbestos contained therein;

(e) allowing said composition to remain in contact with the chrysotile asbestos for a sufficient period of time to reduce the amount of chrysotile asbestos contained in said building material to less than 1% by weight of the resultant material; and permitting said resultant material to remain on the substrate in the building.

2. A method of treating a chrysotile asbestos-containing porous building material (ACM) installed on a substrate in a building, comprising:

(a) providing an admixture composition derived by admixing (i) water, (ii) at least about 10 weight percent at least one hexafluorosilicate or tetrafluoroborate salt of ammonia, alkali metal, alkaline earth metal or mixtures of said salts, (iii) up to about 7 weight percent of an inorganic acid, or acidic salt or mixture thereof, and (iv) a stable foam generating amount of a foam agent system comprising at least one agent providing cationic and non-ionic functionality in a molar ratio of cationic to non-ionic functional group of from about 100:1 to 1:100

(b) foaming the admixture composition from step (a);

(c) applying the resulting foamed composition to the ACM chrysotile asbestos-containing building material;

(d) permitting the foamed composition to remain on and penetrate the building material and contact the chrysotile asbestos contained therein;

(e) allowing said composition to remain in contact with the chrysotile asbestos for a sufficient period of time to reduce the amount of chrysotile asbestos contained in said building material to less than 1% by weight of the resultant material; and (f) permitting said resultant material to remain on the substrate in the building.

3. The method of claim 1 or 2, wherein the building material is a gypsum-containing cementitious building material in the form of a coating on a building component substrate.

4. The method of claim 1 or 2, wherein the foaming agent system comprises a mixture of at least one cationic agent and at least one non-ionic agent selected from polyalkoxy compounds having at least about 10 alkoxy groups per molecule.

5. The method of claim 1 or 2, wherein the foaming agent system comprises a single agent having both cationic and non-ionic functionality.

6. The method of claim 1 or 2, wherein the added cationic foaming agent comprises a betaine.

7. The method of claim 1, wherein the acid component comprises phosphoric acid present in a concentration of from about 30 to about 45 weight percent, and the source of fluoride ions comprises an ammonium or alkali metal fluoroborate or fluorosilicate present in a concentration of from about 0.5 to about 2 percent by weight based on the total weight of said composition.

8. The method of claim 1 wherein the source of fluoride is selected from a fluorosilicate or fluoroborate salt of an alkali metal, alkaline earth metal or ammonia.

9. The method of claim 2 wherein the composition is derived by admixing (a) water, (b) at least one hexafluorosilicate salt of ammonia, alkali metal, alkaline earth metals or mixtures thereof, and (c) up to about 7% by weight based on the weight of the composition, of an inorganic acid, an inorganic acidic salt or mixtures thereof, wherein the hexafluorosilicate salt is present in a concentration of at least about 10 weight percent of the composition.

10. The method of claim 2 wherein the composition is derived by admixing (a) water, (b) at least one tetrafluoroborate salt of ammonia, alkali metal, alkaline earth metals or mixtures thereof, and (c) up to about 7% by weight based on the weight of the composition, of an inorganic acid, an inorganic acidic salt or mixtures thereof, wherein the tetrafluoroborate salt is present in a concentration of at least about 10 weight percent of the composition.

* * * * *